United States Patent

Malec et al.

[15] 3,637,501

[45] Jan. 25, 1972

[54] COMPLEX ESTERS

[72] Inventors: Robert E. Malec, Birmingham; Peter A. Immethun, Southfield, both of Mich.

[73] Assignee: Ethyl Corporation, New York, N.Y.

[22] Filed: July 3, 1969

[21] Appl. No.: 839,052

Related U.S. Application Data

[63] Continuation-in-part of Ser. No. 773,665, Nov. 5, 1968, abandoned.

[52] U.S. Cl. ............................................. 252/57, 260/475
[51] Int. Cl. ................................................. C10m 1/26
[58] Field of Search ................... 252/565, 57; 260/475 P

[56] References Cited

UNITED STATES PATENTS 2,956,954  10/1960  Hoare et al. ............................ 252/57
3,000,917  9/1961  Babayan ............................ 252/56 X
3,133,958  5/1964  Broadhead ............................ 260/475

*Primary Examiner*—Daniel E. Wyman
*Assistant Examiner*—W. Cannon
*Attorney*—Donald L. Johnson

[57] ABSTRACT

A complex ester is made by the reaction of a neopentyl-type polyol such as pentaerythritol, trimethylolpropane, or neopentyl glycol; an aromatic polycarboxylic acid such as phthalic, trimellitic, pyromellitic, or mellitic acid, and an aliphatic monocarboxylic acid having from 2-12 carbon atoms, in proportion such that the average number of carbon atoms per acid molecule is from 4-10. The esters have exceptionally low pour points, high viscosity index, and are suitable for lubricating turbine bearings.

11 Claims, No Drawings

COMPLEX ESTERS

This application is a continuation-in-part of application Ser. No. 773,665, filed Nov. 5, 1968, now abandoned.

BACKGROUND

With the development of gas turbine aircraft engines, which must operate at peak efficiency at extremely high altitudes, there has developed needs for lubricants which can endure the extremely high temperatures encountered in these engines for long periods of time and yet remain fluid at the very low temperatures to which these engines are exposed in arctic regions or when the engine is shut down during flight. Engine manufacturers and operations personnel dealing with these engines require a lubricant possessing exceptionally low viscosity at low temperatures and, at the same time, possessing a satisfactory lubricating viscosity at higher temperatures. During the period from about 1940–45, ester lubricants were developed for use primarily in the early turbine engines. The development of these lubricants is described in such publications as Zorn, "Esters as Lubricants," available from the Air Documents Division, T–2 AMC Microfilm No. RC–718 F–18614, Wright Field, Dayton, Ohio, released in July 1947. Until recently, turbojet aircraft have operated at subsonic speeds. The lubrication of turbojet engines in this service has generally been satisfied using diesters of aliphatic dicarboxylic acid such as di-2-ethylhexyl sebacate. Newer aircraft now in service and other aircraft now under development will be required to operate at supersonic speeds requiring higher output turbojet engines. This will place greater stress upon lubricant stability and requires the development of new lubricants which can be used in this service.

SUMMARY

The present invention relates to a new class of complex esters useful as lubricants for turbine engines under extreme temperature conditions. In particular, this invention relates to complex esters made by the reaction of neopentyl-type polyols, aromatic polycarboxylic acids and aliphatic monocarboxylic acids.

PREFERRED EMBODIMENTS

An object of this invention is to provide new complex esters having good stability, low pour points and high viscosity index which are suitable as lubricants for gas turbines, especially turbojet aircraft engines and stationary turbine engines. These and other objects are attained by providing a synthetic complex ester made by reacting, under esterifying conditions, in at least one step:

A. one equivalent weight, based on hydroxyl content of a polyol having the formula:

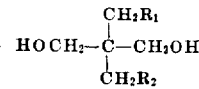

wherein $R_1$ is selected from hydrogen or hydroxyl and $R_2$ is selected from hydrogen, hydroxyl and alkyl radicals containing one to three carbon atoms;

B. from about 0.003 to 0.33 equivalent weight of an aromatic polycarboxylic acid having the formula:

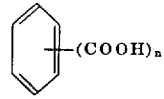

wherein $n$ is an integer from 2–6 and the equivalent weight is based on the number of carboxyl groups in the molecule or the equivalent amount of the anhydride form of said aromatic polycarboxylic acid; and C. from 0.66 to 0.997 mole weight of an aliphatic monocarboxylic acid containing from two to 12 carbon atoms in proportion such that the average number of carbon atoms per molecule is from four to 10.

Although the complex esters can be made by mixing all three types of reactants in the proper proportion and then conducting the esterification in one step, it is preferred that the reaction be carried out in two steps. In the first step, the polyol is reacted with the aromatic polycarboxylic acid or anhydride under esterifying conditions until substantially all of the carboxylic acid groups of the aromatic acid are esterified. As a second step, the aliphatic monocarboxylic acid is added and the esterification of the polyol completed. Generally, access aliphatic monocarboxylic acid is used. The amount that will enter into esterification is controlled by the amount of available hydroxyl groups. Since the aromatic polycarboxylic acid or anhydride will have already esterified part of the available hydroxyl radicals, the amount of aliphatic monocarboxylic acid that will react is fixed. When the hydroxyl content of the final ester is sufficiently low, any excess aliphatic monocarboxylic acid can be removed by washing with an aqueous alkaline solution followed by treatment with alumina, activated charcoal, or a combination of such treatments.

The polyols used in making the esters are referred to as "neopentyl-type" polyols. This is because they contain a neopentane (2,2-dimethylpropane) molecular configuration. Examples of polyols meeting this requirement are pentaerythritol, trimethylolethane, 1,1,1-trimethylolpropane, 1,1,1-trimethylolbutane, 1,1,1-trimethylolpentane, 1,1,1-trimethylol-3-methylbutane, neopentyl glycol, 2,2-dimethylolbutane (neohexyl glycol), 2,2-dimethylolpentane, 2,2-dimethylolhexane, and 2,2-dimethylol-4-methylpentane. Mixtures of the above neo-type polyols can also be used.

Of the foregoing, the preferred polyols are the trihydric neo-type polyols such as trimethylolethane, trimethylolpropane and trimethylolbutane. The most preferred polyol is trimethylolpropane.

Suitable polycarboxylic aromatic acid include those having at least one mono-nuclear or polynuclear aromatic portion with at least two and up to six carboxylic acid groups bonded to a benzene ring in the mononuclear or polynuclear aromatic portion. Other substituents can be bonded to the aromatic nucleus as long as they do not adversely affect the properties of the final complex ester. For example, alkyl radicals, halogens such as chlorine, bromine, or fluorine, can be bonded to the aromatic nucleus.

The preferred aromatic polycarboxylic acids are the mononuclear aromatic polycarboxylic acids. Some examples of these are terephthalic, isophthalic, phthalic, trimellitic, trimesic, pyromellitic, benzene pentacarboxylic and mellitic acids. These, of course, can be used in their anhydride form such as trimellitic anhydride.

Suitable aliphatic monocarboxylic acids include those having from two to 12 carbon atoms such as acetic, propionic, n-butyric, isobutyric, n-valeric, isovaleric, 3-methylbutyric, caproic, 2-methylvaleric, enanthylic, 2-methyl caproic, caprylic, 2-methylenanthylic, pelargonic, 3-methylenanthylic, 2,4-dimethyl caproic, 2-methyl caprylic, capric, lauric, 2-methylundecylic, undecylic, and the like.

The more preferred aliphatic monocarboxylic acids are the straight chain acids or those in which a substantial amount of the acid is straight chain.

The aliphatic acids can all have the same number of carbons atoms or they may be mixtures of acids containing different numbers of carbon atoms from two to 12. The proportion of the different acids in mixtures is such that the average carbon atoms per molecule ranges from four to 10. For example, a mixture of 50 mole percent acetic acid and 50 mole percent lauric acid has an average of seven carbon atoms per molecule. Naturally, if the aliphatic acids are all of the same carbon number this must be between four and 10 carbon atoms in order to obtain the required average.

Although the aliphatic monocarboxylic acids containing from two to 12 carbon atoms and having an average of four to 10 carbon atoms give satisfactory results for most applications, particularly preferred aliphatic monocarboxylic acids are those containing from four to 10 carbon atoms in proportion such that the average number of carbon atoms is from five to nine. This results in complex ester lubricants having the most desirable viscosity and stability properties.

Exceptionally good results are obtained using n-octanoic acid or a mixture of n-hexanoic, n-octanoic, and n-decanoic acids. A particularly preferred mixture of such acids is one containing from about 15-25 weight percent n-hexanoic, from 33-43 weight percent n-octanoic, and from 37-47 weight percent n-decanoic acids. A still more preferred acid mixture is one containing about 24-28 weight percent n-hexanoic, about 41-45 weight percent n-octanoic, and about 29-33 weight percent n-decanoic acid. The acid mixture is substantially straight chain, but can contain a small amount, up to about 5 percent, of branched chain acids without detrimental results.

The complex of esters made according to this invention are mixtures of:

1. complex esters derived from neopentyl-type polyols, aromatic polycarboxylic acids and aliphatic monocarboxylic acids, and
2. aliphatic monocarboxylic acid esters of the same polyol.

The aliphatic monocarboxylic acid esters of the polyol result because only from about 0.003 to 0.33 equivalent weights of the aromatic polycarboxylic acid are used per equivalent weight of polyol. An equivalent weight of polyol is the molecular weight of the polyol, or average molecular weight if it is a mixture of polyols, divided by the number of hydroxyl radicals per molecule, or average number of hydroxyl radicals per molecule if it is a mixture. For example, the equivalent weight of trimethylolpropane is 44.7 weight units (134 divided by 3). Likewise, an equivalent weight of the aromatic polycarboxylic acid is the molecular weight, or average molecular weight, divided by the number, or average number, of carboxylic acid groups. For example, the equivalent weight of trimellitic acid is 70 weight units (210 divided by 3). Since only up to 0.33 equivalent weights of aromatic polycarboxylic acid are used per equivalent weight of polyol, some of the polyol will not react with the aromatic polycarboxylic acid. This unesterified polyol reacts with the aliphatic monocarboxylic acid, forming aliphatic monocarboxylic acid esters of the polyol. The polyol that does react with the aromatic polycarboxylic acid forms an intermediate partial ester of the polyol which is completed by further reaction with aliphatic monocarboxylic acids to form a complex ester. The exact compositions are not readily defined and cannot be easily determined and hence are best described by reference to the process used to make them. However, some insight into their composition can be obtained by the following formula, which is a simplification of the exact structure and does not take into account all possibilities. Most of the complex ester is believed to have the formula:

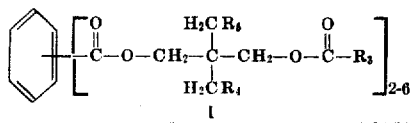

I wherein $R_3$ is either the aliphatic portion of the aliphatic monocarboxylic acid or a complex group having the formula:

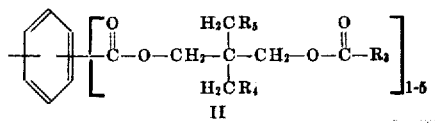

II wherein $R_3$ is the same as above. In Formulas I and II, $R_4$ can be hydrogen, a lower alkyl containing one to three carbon atoms, a complex group represented by above Formula II, or an ester group represented by the formula:

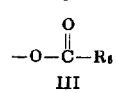

III wherein $R_6$ is the aliphatic portion of the aliphatic monocarboxylic acid employed. In the above formulas, $R_5$ can be hydrogen, a complex group of formula II or an ester group of formula III. Since the complex group represented by formula II also contains $R_3$, $R_4$ and $R_5$ in its definition, it allows for an infinite progression of complex groups. Actually, because of the reactant ratios employed, very little complex esters from in which $R_3$ in formula I is the above complex group of formula II. When this does occur, the probability of $R_3$ in the complex group of formula II, being a further complex group, is so remote that, for practical purposes, $R_3$ in formula II is substantially the aliphatic portion of the aliphatic monocarboxylic acid used in the preparation. Likewise, $R_4$ and $R_5$ in formula I are rarely complex groups of formula II. When they are, the chance of $R_4$ or $R_5$ in formula II being further complex groups of formula II is so remote that, for practical purposes, $R_4$ in formula II is selected from hydrogen, lower alkyls containing one to three carbon atoms, and ester groups of formula III, and $R_5$ in formula II is selected from hydrogen and ester groups of formula III.

The complex mixture is made by reacting, under esterifying conditions, in at least one step, one equivalent weight of a neopentyl-type polyol, from about 0.003-0.33 equivalents of an aromatic polycarboxylic acid or anhydride and from about 0.66 to 0.997 mole parts by weight of a $C_{2-12}$ aliphatic monocarboxylic acid. By esterifying conditions is meant that the reaction is carried out under conditions well known in the art to cause an organic carboxylic acid and an alcohol to form an ester by eliminating a molecule of water. This is generally promoted by heating the mixture containing the organic carboxylic acid and the alcohol. A temperature range of from about 75°-300° C. is employed. Preferably, the reaction is carried out at a temperature high enough to cause the water formed to distill out, but not so high as to cause decomposition of the reactants or products. Frequently, removal of the water is facilitated by including a water-insoluble azeotroping solvent in the reaction mixture. Suitable solvents include aliphatic or aromatic hydrocarbons. The aromatic hydrocarbons such as benzene, toluene, xylene, mesitylene, and the like, are especially useful. When these are used esterification is generally conducted at the boiling point of the mixture and the water removed from the distillate by phase separation. The solvent is returned to the reaction mixture until esterification is complete. If higher temperatures are desired using an azeotroping solvent, the reaction can be carried out under pressure sufficient to raise the boiling point of the mixture to the desired reaction temperature.

The esterification rate is also increased by adding an esterification catalyst to the mixture. Acidic catalysts have been found to be most useful. These catalysts include sulfuric acid, phosphoric acid, p-toluene sulfonic acid, sodium bisulfate, potassium bisulfate, sulfonated polystyrene acidic ion exchange resins, and the like. Other useful catalysts include esters of titanium or zirconium such as tetraalkyl titanates or zirconates (e.g., tetraethyl titanate, tetrabutyl titanate, tetra-n-propyl zirconate, etc.). The amount of catalyst is not critical. Only enough is required to promote a reasonable esterification rate. A useful range is from 0.001 to 5 weight percent, based on the weight of the reaction mixture. A preferred catalyst concentration is from 0.1 to 3 weight percent.

As stated previously, the esters can be made in at least one step. In the one-step operation all of the reactants are mixed together in the proper ratio and the mixture placed under esterification conditions until ester formation is substantially complete. The preferred method of making the esters is to employ a two-step process. In this preferred method, the neo-type polyol and the aromatic polycarboxylic acid or anhydride are first mixed and placed under esterification conditions until the aromatic polycarboxylic acid or anhydride is substantially fully esterified. After this, an amount at least sufficient to substantially fully esterify the unesterified hydroxyl groups on the partially esterified polyol of the aliphatic monocarboxylic acid is added and esterification of the neo-type polyol is completed. This method permits the use of excess aliphatic monocarboxylic acid in the second step because the amount that will react is limited by the amount of free hydroxyl.

The esterification is conducted until the hydroxyl number of the mixture is reduced below about 5. Following this, the ester is subjected to various treatments to remove undesirable material. Solvents or excess aliphatic carboxylic acids can be removed by heating the ester, preferably under vacuum, to a temperature high enough to cause them to distill out. Temperatures of from 100°–250° C. at vacuums under 50 mm. of Hg, preferably under 10 mm. of Hg, are usually sufficient. Residual acid can be removed by washing the ester with an aqueous base such as sodium carbonate or sodium hydroxide. Alternatively, the ester can be first washed with aqueous base prior to distilling out the solvent. This latter method allows the removal of residual water with the solvent. Further drying of the ester can be accomplished by treatment with any of the known drying agents such as anhydrous sodium sulfate. It is generally desirable to subject the final ester to further treatment with an adsorbent material such as activated clay, alumina or charcoal, to remove trace acids and other impurities.

The methods of making the esters are readily understood from the following examples. All parts are by weight unless otherwise specified.

EXAMPLE 1

In a reaction vessel equipped with stirrer, thermometer, heating means and provided with a nitrogen atmosphere was placed 134.1 parts of trimethylolpropane (3 equivalent weights), 41.5 parts of isophthalic acid (0.5 equivalent weights), 150 parts of xylene and one part of p-toluene sulfonic acid. The mixture was stirred and heated to reflux. Reflux was continued for 15 hours, during which period the water which codistilled with the xylene was removed from the system using a Dean-Stark water separator. After this step, the mixture was cooled and 360 parts of n-octanoic acid (2.5 mole parts) were added. The mixture was again heated to reflux, which was continued for 48 hours. The product was cooled and washed with 300 parts of 10 percent aqueous sodium carbonate solution. Following this, the product was washed with water and then twice with 10 percent sodium carbonate solution, followed by three additional water washes. It was dried over anhydrous sodium sulfate and then filtered. The solvent was distilled out at about 5 mm. Hg up to a liquid temperature of 130° C. The final complex ester had the following properties:

| | |
|---|---|
| viscosity c.p.s. | 63.6 at 100° F., 9.13 at 210° F. |
| viscosity index | 132 |
| pour point | 50° F. |

The foregoing general procedure was followed to prepare a variety of complex esters of this invention. The following table lists the reactants and the properties of the product.

| Ester | Polyol Type | Equivalent | Aromatic polyacid Type | Equivalent | Aliphatic monoacid [1] Type | Equivalent | Viscosity 100 °F. | Viscosity 210 °F. | Viscosity index | Pour point | Viscosity, −40° F. |
|---|---|---|---|---|---|---|---|---|---|---|---|
| 1 | TMP [2] | 3.0 | Trimellitic | .5 | Octanoic | 2.5 | 77.9 | 10.8 | 137 | −55 | |
| 2 | TMP | 3.0 | Isophthalic | .30 | Hexanoic / Octanoic / Decanoic | 0.9 / 0.9 / 0.9 | 20.7 | 4.3 | 130 | −80 | |
| 3 | TMP | 3.0 | Phthalic | .5 | Octanoic | 2.5 | 49.7 | 7.4 | 121.5 | −60 | |
| 4 | TMP | 3.0 | Isophthalic | .5 | Hexanoic | 2.5 | 47.1 | 7.2 | 124.5 | −65 | |
| 5 | TMP | 3.0 | do | .5 | Hexanoic / Octanoic | 1.25 / 1.25 | 47.7 | 7.4 | 127.5 | −60 | |
| 6 | NPG [3] | 2.0 | do | .8 | Octanoic / Decanoic | 0.6 / 0.6 | 32.5 | 5.6 | 121 | −65 | |
| 7 | TMP | 3.0 | Trimellitic | .3 | Hexanoic / Octanoic / Decanoic | 0.9 / 0.9 / 0.9 | 36.9 | 6.6 | 145 | −80 | |
| 8 | TMP | 3.0 | do | .3 | Hexanoic / Octanoic | 1.35 / 1.35 | 32 | 5.9 | 141.5 | −70 | 11,076 |
| 9 | TMP | 3.0 | do | .3 | Octanoic | 2.7 | 44.5 | 7.5 | 145.5 | −70 | |
| 10 | TMP | 3.0 | do | .3 | Hexanoic / Octanoic / Decanoic | 1.09 / .88 / .73 | 36 | 6.4 | 143 | −60 | 13,114 |
| 11 | TMP | 3.0 | Pyromellitic | .3 | Hexanoic / Octanoic | 1.35 / 1.35 | 35.2 | 6.4 | 147 | −70 | 12,211 |
| 12 | TMP | 3.0 | do | .24 | Hexanoic / Octanoic / Decanoic | .92 / .92 / .92 | 33 | 6.1 | 146 | −75 | 10,171 |
| 13 | TMP | 3.0 | do | .20 | Hexanoic / Octanoic | 1.4 / 1.4 | 24.9 | 5.0 | 140 | −75 | 6,456 |
| 14 | TMP | 3.0 | do | .3 | Hexanoic / Octanoic | 1.35 / 1.35 | 32.2 | 5.9 | 142.5 | | 10,685 |
| 15 | TMP | 3.0 | Trimellitic | .24 | Hexanoic / Octanoic / Decanoic | .92 / .92 / .92 | 32.4 | 6.0 | 142.5 | −65 | 10,363 |
| 16 | TMP | 3.0 | do | .24 | Hexanoic / Octanoic / Decanoic | .75 / 1.76 / .25 | 29.3 | 5.5 | 138.5 | −80 | 8,766 |
| 17 | TMP | 3.0 | do | .18 | Hexanoic / Octanoic / Decanoic | .94 / .94 / .94 | 27.2 | 5.3 | 143 | −75 | 7,158 |
| 18 | TMP | 3.0 | do | .3 | Hexanoic / Octanoic | 1.35 / 1.35 | 29.9 | 5.6 | 143 | −75 | 9,315 |
| 19 | TMP | 3.0 | do | .15 | Hexanoic / Octanoic / Decanoic | 1.0 / .83 / 1.02 | 26.3 | 5.2 | 142 | | |
| 20 | TMP | 3.0 | Terephthalic | .25 | Hexanoic / Octanoic / Decanoic | .69 / 1.07 / .99 | 31.8 | 5.8 | 141 | | 10,792 |
| 21 | TMP | 3.0 | Benzenepentacarboxylic acid | .3 | Hexanoic / Octanoic | 1.35 / 1.35 | 30.7 | 6.1 | 161 | −70 | 9,370 |
| 22 | TMP | 3.0 | Mellitic | .3 | Hexanoic / Octanoic | 1.35 / 1.35 | 29.6 | 5.7 | 148.5 | | |
| 23 | TMP | 3.0 | Terephthalic | .2 | Hexanoic / Octanoic / Decanoic | 0.71 / 1.09 / 1.0 | 28.8 | 5.46 | 140 | | |

[1] Substantially straight chain.
[2] TMP is trimethylolpropane.
[3] NPG is neopentyl glycol.

Certain of the above esters meet the MIL-L-23699-A Viscosity and Pour Point Specifications for use in U.S. Navy Jet Aircraft. These specifications require:

| | |
|---|---|
| viscosity at −40° F. | 13,000 c.p.s. max. |
| viscosity at 100° F. | 25 c.p.s. min. |
| viscosity at 210° F. | 5–5.5 c.p.s. |
| pour point | −65° F. |

For example, esters 16 and 17 meet these specifications. These particular esters can be more narrowly defined as the product made by reacting, under esterifying conditions, in at least one step, (A) one equivalent weight of trimethylolpropane, (B) from 0.04 to 0.1 equivalent weight of trimellitic acid, and (C) from 0.9 to 0.96 equivalent weight of an aliphatic monocarboxylic acid selected from the group consisting of n-hexanoic acid, n-octanoic acid, n-decanoic acid, and mixtures thereof.

Esters made using trimethylolpropane, trimellitic acid or anhydride and mixtures of n-hexanoic, n-octanoic and n-decanoic represent a preferred class. Defined even more narrowly than above, this class can be represented by an ester made in at least two stages, the first stage comprising reacting, under esterifying conditions, 1 mole weight of trimethylolpropane and about 0.04–0.07 mole weights of trimellitic acid or anhydride to form a partially esterified trimethylolpropane mixture, and a subsequent stage comprising reacting, under esterifying conditions, the partially esterified trimethylolpropane from the first stage with an amount at least sufficient to substantially fully esterify the unesterified hydroxyl groups on the trimethylolpropane of a mixture of substantially normal aliphatic monocarboxylic acids consisting essentially of 24–28 weight percent n-hexanoic acid, 41–45 weight percent n-octanoic acid, and 29–33 weight percent n-decanoic acid. Preparation of esters of this preferred class is illustrated by the following examples.

EXAMPLE 2

In a glass-lined reaction vessel was placed 13.4 parts of trimethylolpropane, 1.01 part of trimellitic anhydride and 1.8 parts of xylene. While stirring, the mixture was heated to reflux. Xylene was allowed to distill out until the reflux temperature reached 190° C. Reflux was continued controlling the temperature at 190°–230° C. while continuously removing water which codistilled with the xylene. After 5 hours the mixture was cooled and 44.5 parts of a mixture of aliphatic monocarboxylic acids consisting essentially of 26 weight percent n-hexanoic acid, 43 weight percent n-octanoic acid and 31 weight percent n-decanoic acid was added. While stirring, this mixture was heated to reflux and refluxed for 5 hours, controlling the temperature at 230°–240° C. by withdrawing and adding xylene as required. Water was continuously removed from the refluxing xylene. Following this, the mixture was cooled and diluted with 20 parts of hexane. The solution was then washed with 8 parts of 10 percent aqueous caustic and a second time with 4 parts of 10 percent aqueous caustic. Following this, the solution was washed with water until neutral and dried over 5 parts of anhydrous sodium sulfate. Volatiles were distilled from the resultant solution up to a temperature of about 120° C., at which point 0.25 parts of activated alumina (Alcoa F-1) and 0.1 part of decolorizing carbon (Norit-F) was added. Distillation was continued up to 140° C. while the pressure was reduced to about 10 mm. Hg. Finally, the product was filtered, resulting in an ester having exceptionally good physical properties.

EXAMPLE 3

In a reaction vessel equipped with stirrer, heating means, reflux condenser and distillate water trap was placed 134 parts of trimethylolpropane, 9.6 parts of trimellitic anhydride and 8 parts of xylene. While stirring, the mixture was heated to reflux and maintained at a reflux temperature of 180°–200° C. by adjusting xylene content. It was refluxed at 180°–200° C. for 7 hours while continuously removing water from the distillate. After this, 446 parts of an acid mixture consisting essentially of 26 weight percent n-hexanoic, 43 weight percent n-octanoic and 31 weight percent n-decanoic acids were added. Reflux was continued and the temperature allowed to rise to 280° C. over a 3-hour period. The mixture was cooled and diluted with an equal volume of hexane. It was washed twice with 10 percent aqueous caustic and then with water until neutral. It was dried over anhydrous sodium sulfate and filtered. The solvent and other volatiles were then distilled out put to a liquid temperature of 120° C. at 1 mm. Hg. A final filtration gave an ester lubricant having a viscosity at 210° F. of 25.26 c.p.s. and at 100° F. of 5.06 c.p.s.

EXAMPLE 4

In the reaction vessel of example 3 was placed 134 parts of trimethylolpropane and 10.56 parts of trimellitic anhydride. The mixture was heated and maintained at 220°–236° C. over a 4-hour period, during which time water was continuously distilled out. Following this, 404 parts of an acid mixture consisting essentially of 26 weight percent n-hexanoic acid, 43 weight percent n-octanoic acid and 31 weight percent n-decanoic acid were added. The mixture was stirred and refluxed within a temperature range of 195°–235° C. while continuously removing water. Temperature control was accomplished by adding a small amount of xylene. After refluxing for 4 hours the mixture was cooled and diluted with an equal volume of hexane. It was then washed with 140 parts of 10 percent aqueous caustic and a second time with 70 parts of 10 percent aqueous caustic. It was then water washed until neutral and dried over anhydrous sodium sulfate. It was filtered and then the volatiles distilled out up to a temperature of 120° C. at about 1 mm. Hg. Following this, 5 parts of activated alumina and 5 parts of decolorizing carbon were added and this mixture stirred at 100° C. for 30 minutes. Final filtration resulted in a suitable ester lubricant having a viscosity at 100° F. of 26.23 c.p.s., and at 210° F. of 5.24 c.p.s.

Other esters having higher viscosities are useful in the manufacture of ester base greases for applications under extreme temperature conditions. These esters are eminently useful in this application because, although their viscosities are somewhat higher, they surprisingly still possess pour points on the order of −60° to −80° F. Ester base greases are made from the above esters by blending with them about 5–25 weight percent of various thickeners such as sodium, potassium, calcium or lithium soaps of $C_{12-22}$ fatty acids. The preferred thickening agents are the lithium soaps of $C_{18-12}$ fatty acids such as lithium stearate. These soaps may be used alone or in combination with soaps of lower carboxylic acids such as lithium acetate, lithium propionate or lithium butyrate. Oxidative stability of the grease is improved by including antioxidants such as phenothiazine, phenyl-α-naphthyl amine, and the like. About 1 percent of antioxidant is generally sufficient.

The following example illustrates the preparation of a complex ester grease using the above complex esters.

EXAMPLE 5

In a blending vessel is placed 100 parts of ester 20 from the above table, 17 parts of an equal mole mixture of lithium acetate and a lithium soap made from a mixture of $C_{16-18}$ fatty acids of even carbon number, and one part of phenothiazone. The mixture is stirred and heated to about 500° F. until it has a smooth consistency. It is then cooled, resulting in a useful ester base grease.

Any of the previously listed esters may be used to prepare synthetic ester greases following the above general procedure.

In preparing turbine lubricants using the esters of this invention it is preferred to include other additives to improve the properties of the lubricants. These include antioxidants, metal passivators, extreme pressure agents, antifoam agents, and the like. A useful antioxidant range is from 0.01 to 5.0 weight percent. The preferred antioxidants include:

phenothiazine phenyl-α-naphthyl amine phenyl-β-naphthyl amine
dioctyldiphenyl amine
N-alkylphenothiazines
dipyridyl amine
5-ethyl-10,10-diphenylphenazasilane
3,7-dialkylphenothiazines
diphenyl amine
dinaphthyl amine
butyl-α-naphthyl amine
ditolyl amine
phenyl tolyl amine
tolyl naphthyl amine
dicyclohexyl amine
diphenyl p-phenylene diamine
4-tert-butyl catechol
2,6-di-tert-butyl-p-cresol
hexyl gallate
tri-nonylphenyl phosphite
polymerized trimethyl dihydroquinoline
p,p'-dioctyl diphenyl amine
octylphenyl-β-naphthyl amine
octylphenyl-α-naphthyl amine
p-amino diphenyl amine
o-aminophenol
hydroxy dipheyl amine
dodecyl aniline
3-pentadecyl-4-aminophenol
10-methyl-3,7-dioctyl phenothiazine
10n-octyl-3,7-dioctyl phenothiazine
10-phenyl-3,7-dioctyl phenothiazine
10-tolyl-3,7-dioctyl phenothiazine
10-cyanoethyl-3,7-dioctyl phenothiazine
10-cyanobutyl-3,7-dioctyl phenothiazine
10-benzyl-3,7-diisopropoxy phenothiazine
10-benzyl-3,7-dibutoxy phenothiazine Metal passivators are used in concentrations from 0.001 to 2.0 weight percent. Useful metal passivators include:
1,4-dihydroxy anthraquinone
1-salicylalaminoguanidine
benzotriazole
benzimidazole
butylbenzothiazole
methylene-bis-benzotriazole
$C_{14-18}$ aliphatic carboxylic salt of 1-salicylalaminoguanidine
polyhydroxyanthraquinone
N,N'-disalicylidene-1,2-propane diamine
N,N'-disalicylidene-1,2-ethane diamine
quinizarin
alizarin Extreme pressure agents are used in concentrations from 0.1 to 5.0 weight percent. Typical extreme pressure agents are the esters of acids of phosphorus including triarylphosphates such as triphenylphosphate, tricresylphosphate, phenyl-dicresylphosphate, tritolylphosphate and the tri-alkylphosphates and phosphonates such as tri-n-butylphosphate, tri-(2-ethylhexyl)phosphate, tri-methylcyclohexylphosphate, tri-butylphosphonate, tri-(β-chloroisopropyl)phosphonate, and the like.

Silicones such as dimethyl silicone, diethyl silicone, and the like, are used in small amounts, from about 1 to 50 p.p.m., to inhibit foam.

The following examples illustrate the blending of typical turbine lubricants using the esters of this invention.

EXAMPLE 6

In a blending vessel is placed 100 parts of the ester 17 from the above table. To this is added one part of phenyl-α-naphthyl amine, one part of dioctyldiphenyl amine, 0.1 part of a fatty acid salt of 1-salicylalaminoguanidine, 0.02 part of 1,4-dihydroxy anthraquinone, 3 parts of tricresylphosphate and 5 p.p.m., based on the total, of dimethyl silicone. The mixture is stirred until homogeneous and then filtered through a fine filter, resulting in an ester lubricant suitable for use in lubricating turbine bearings.

EXAMPLE 7

In a blending vessel place 1,000 parts of the ester of example 2, 50 parts of tricresylphosphate, 30 parts of 3,7-dioctylphenothiazine, 1 part of quinizarin and 0.05 part of dimethyl silicone. Stir the mixture until homogenous and then filter, giving a suitable formulated ester lubricant.

EXAMPLE 8

In a blending vessel place 1,000 parts of ester 23 from the above table, 10 parts of phenyl-α-naphthyl amine, 10 parts of dioctyldiphenyl amine, 5 parts of benzothiazole and 20 parts of tricresylphosphate. Stir the mixture until homogenous and filter to obtain a synthetic lubricant suitable for use in turbine engines.

Other complex esters of this invention are readily produced. The following examples serve to illustrate several of these.

EXAMPLE 9

In a reaction vessel fitted with stirrer, heating means and thermometer place 34 parts of pentaerythritol, 0.21 part of trimellitic acid, 30 parts of xylene and 0.3 part of potassium bisulfate. Stir and heat to reflux. Reflux for 8 hours while removing water and recycling xylene. Cool and add 126 parts of n-hexanoic acid. Stir and heat to reflux. Reflux for 12 hours while removing water and recycling xylene. Cool and wash 3 times with an aqueous solution containing 5 percent sodium carbonate and 3 percent sodium chloride. Wash with water and dry over anhydrous calcium sulfate. Distill out the xylene at 1 mm. Hg up to a liquid temperature of 150° C. Pass the ester through a column packed with activated alumina, and finally, filter the ester, giving a synthetic complex ester suitable for use as a lubricant.

EXAMPLE 10

In the reaction vessel of example 4 place 59 parts of neohexyl glycol, 27.2 parts of isophthalic acid, 150 parts of mesitylene, 2 parts of p-toluene sulfonic acid and a mixture of 12.6 parts of n-hexanoic acid, 61.5 parts of n-octanoic acid, 18.2 parts of n-decanoic acid and 12.6 parts of n-dodecanoic acid. Stir and heat to reflux. Reflux 8 hours while removing water and recycling solvent. Cool and wash four times with an aqueous solution containing 5 percent sodium carbonate and 3 percent potassium chloride. Wash two times with water and then distill out the mesitylene at 0.5 mm. Hg up to a liquid temperature of 170° C. Cool and add 50 parts of activated charcoal. Stir for 30 minutes and then filter. Finally, pass the ester through an activated alumina packed column and filter, resulting in a useful ester lubricant.

EXAMPLE 11

In the reaction vessel of example 4 place 54 parts of 1,1,1-trimethylolpentane, 11.9 parts of benzene pentacarboxylic acid, 1 part of sodium bisulfate and 100 parts of xylene. Stir and heat to reflux. Reflux 8 hours while removing water and recycling solvent. Cool and add a mixture of 9 parts of acetic acid, 7.4 parts of propionic acid, 29.4 parts of valeric acid and 30.5 parts of enanthylic acid. Stir and heat the mixture to reflux. Reflux for 6 hours and then cool. Wash first with water and then three times with an aqueous solution containing 5 percent sodium carbonate and 3 percent sodium chloride. Wash the ester with water and then dry over anhydrous sodium sulfate. Filter the product and distill out the solvent at 1 mm. Hg up to a liquid temperature of 150° C. Cool and stir while adding 10 parts of activated charcoal. After 30 minutes, filter and pass the filtrate through a column of activated alumina, resulting in a useful synthetic lubricant.

Following the above general procedures, other synthetic ester lubricants of this invention can readily be made by substituting other neo-type polyols, aromatic polycarboxylic acids and aliphatic monocarboxylic acids as defined herein.

Other esters shown in the foregoing table also meet the viscosity requirements of MIL-L23699-A. For example, ester 23 has excellent viscosity properties. This ester is made from trimethylolpropane, terephthalic acid and a mixture of n-hexanoic, n-octanoic and n-decanoic acids. It can be defined more narrowly as an ester made by reacting, under esterifying conditions, in at least one step, A. one equivalent weight of trimethylolpropane,
B. from 0.03 to 0.1 equivalent weight of terephthalic acid per equivalent weight of trimethylolpropane, and
C. from about 0.9 to 0.97 mole weight of a mixture of n-hexanoic, n-octanoic and n-decanoic acids in proportion such that their weight ratio is from about 15–30 weight percent n-hexanoic acid, 35–45 weight percent n-octanoic acid and 35–45 weight percent n-decanoic acid.

The ester has a viscosity index (VI) of 140. The VI of the other esters made according to this invention are also significantly higher than ordinarily encountered with ester lubricants. Thus, the present invention not only makes available esters having desirable viscosity values, but also esters having an exceptionally high viscosity index.

In much of the foregoing description of the preferred embodiments of this invention the acids have been named and used in the examples in their free form. As any chemist will recognize, these acids can be introduced into the reaction in other forms such as their esters or anhydrides. When esters of the acids are used they should be lower alkyl esters such as methyl esters so the lower alcohols can be readily displaced by the polyol and distilled from the reaction zone. The anhydrides are especially useful means of adding the organic acids, especially the aromatic polycarboxylic acids. For example, phthalic anhydride, trimellitic anhydride, pyromellitic anhydride, and the like, can be used in preparing the esters of this invention with equivalent results.

We claim:

1. An ester suitable for use as a lubricant made by reacting, under esterifying conditions, in at least one step:
   a. one equivalent weight, based on hydroxyl content of a polyol having the formula:

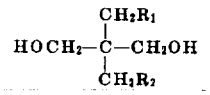

wherein $R_1$ is selected from hydrogen or hydroxyl and $R_2$ is selected from hydrogen, hydroxyl and alkyl radicals containing one to three carbon atoms:
   b. from about 0.003 to 0.33 equivalent trimellitic acid or anhydride and
   c. from 0.66 to 0.997 mole weight of aliphatic monocarboxylic acid containing from two to 12 carbon atoms in proportion such that the average number of carbon atoms per molecule is from four to 10.

2. The ester of claim 1 wherein said aliphatic monocarboxylic acids contain from four to 10 carbon atoms in proportion such that the average number of carbon atoms per molecule is from five to nine.

3. The ester of claim 2 wherein said aliphatic monocarboxylic acids are straight chain aliphatic monocarboxylic acids.

4. The ester of claim 1 wherein said polyol is pentaerythritol.

5. The ester of claim 1 wherein said polyol is neopentyl glycol.

6. The ester of claim 1 wherein said polyol is neohexyl glycol.

7. The ester of claim 1 wherein said polyol is trimethylolpropane.

8. The ester of claim 7 wherein said trimellitic acid is in the proportion of from 0.04 to 0.1 equivalent weights per equivalent weight of said trimethylolpropane and said aliphatic monocarboxylic acid is in the proportion of from 0.9 to 0.96 equivalent weights per equivalent weight of said trimethylolpropane and is selected from the group consisting of n-hexanoic acid, n-octanoic acid, n-decanoic acid and mixtures thereof.

9. An ester of claim 8 wherein said aliphatic monocarboxylic acid is a mixture consisting essentially of about 15–25 weight percent n-hexanoic acid, about 33–43 weight percent n-octanoic acid and about 37–47 weight percent n-decanoic acid.

10. A synthetic ester lubricant comprising a blend of
    1. at least 90 weight percent of an ester of claim 1,
    2. from 0.01 to 5 weight percent of an antioxidant for synthetic ester lubricants,
    3. from 0.001 to 2 weight percent of a metal passivator, and
    4. from 0.1 to 5 weight percent of an extreme pressure wear agent.

11. A synthetic ester made in at least two stages, the first stage comprising reacting, under esterifying conditions, one mole weight of trimethylolpropane and from about 0.04 to 0.07 mole weights of trimellitic acid or anhydride to form a partially esterified trimethylolpropane mixture, and a subsequent stage comprising reacting, under esterifying conditions, the partially esterified trimethylolpropane from the first stage with an amount at least sufficient to substantially fully esterify the unesterified hydroxyl groups on said trimethylolpropane of a mixture of substantially normal aliphatic monocarboxylic acids consisting essentially of about 24–28 weight percent n-hexanoic acid, about 41–45 weight percent n-octanoic acid, and about 29–33 weight percent n-decanoic acid.

* * * * *

UNITED STATES PATENT OFFICE
CERTIFICATE OF CORRECTION

PO-1050 (5/69)

Patent No. 3,637,501     Dated January 25, 1972

Inventor(s) Robert E. Malec and Peter A. Immethun

It is certified that error appears in the above-identified patent and that said Letters Patent are hereby corrected as shown below:

Column 6, line 24, "c.p.s." should read -- (cs) --; line 26, "50°F." should read -- -50°F. --. Column 7, lines 5, 6 and 7, "c.p.s." should read -- cs --. Column 8, line 12, "c.p.s.", both occurrences, should read -- cs --; line 37, "c.p.s.", both occurrences, should read -- cs --. Column 11, Claim 1, line 46, insert "weights of" after "equivalent".

Signed and sealed this 22nd day of August 1972.

(SEAL)
Attest:

EDWARD M. FLETCHER, JR.
Attesting Officer

ROBERT GOTTSCHALK
Commissioner of Patents